UNITED STATES PATENT OFFICE.

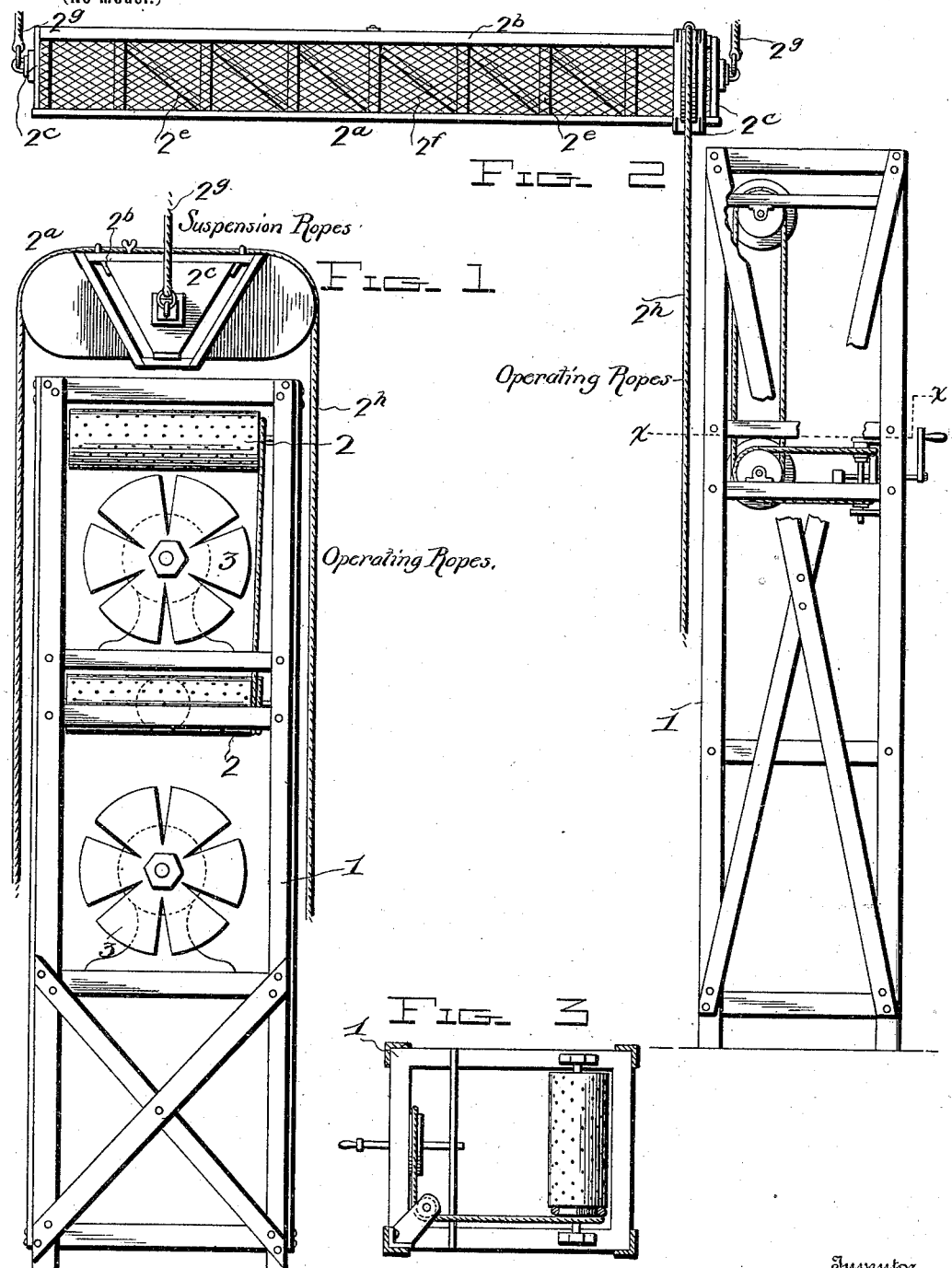

JOSEPH R. GRISMER, OF NEW YORK, N. Y.

THEATRICAL APPLIANCE.

SPECIFICATION forming part of Letters Patent No. 635,043, dated October 17, 1899.

Application filed December 2, 1898. Serial No. 698,070. (No model.)

*To all whom it may concern:*

Be it known that I, JOSEPH R. GRISMER, a citizen of the United States, residing at New York, (Bayside, Long Island,) in the county of Queens and State of New York, have invented certain new and useful Improvements in Stage Appliances; and I do declare the following to be a full, clear, and exact description of the invention, such as will enable others skilled in the art to which it appertains to make and use the same.

The invention relates to stage appliances.

The object of the invention is to provide means for producing a realistic snow-storm, in which the snow appears to be driven past the windows and doors by gusts of wind, as in heavy snow-gales, and is caused to drift and bank against the door-jamb, window-frames, and other places, thus simulating in the highest degree a violent snow-storm. To get this effect, I employ flakes of paper and combine with them pulverized or granular substances, preferably of greater specific gravity than the paper flakes—such, for instance, as salt, meal, or white sand.

With this object in view the invention consists in certain features of construction and combination of parts, which will be hereinafter fully described and claimed.

In the accompanying drawings, Figure 1 is a front view of my improved machine. Fig. 2 is a side view, partly in section, the fans being omitted. Fig. 3 is a cross-sectional view on the line X X of Fig. 2.

In the drawings the same reference characters indicate the same parts of the invention.

1 denotes an upright frame supporting one or more receptacles 2, preferably in the form of perforated cylinders arranged in different horizontal planes and adapted to drop or discharge sand, salt, meal, or any granular or pulverized substance.

$2^a$ denotes a flake-dropper, being a device designed for dropping or discharging flakes in the form of small pieces of paper. The flake-dropper is of a well-known construction and in itself forms no part of my invention, as any form of flake-dropper may be provided without departing from the spirit of my invention. The one shown consists of a framework comprising the longitudinal sides $2^b$, the end pieces $2^c$, the slats $2^e$, and the coarse wire-netting $2^f$. It is suspended from above by cords $2^g$ and is operated by a cord $2^h$, which extends around and is fastened to one of the end pieces.

Below each of the cylinders is a fan 3, designed to expel or force the granular or pulverized substance as it falls from said cylinders across the stage into the path of the falling paper flakes, the two thus being combined and forced across the stage. The granular or pulverized substance when combined with the flakes and forced across the stage by the blast from the fan will be driven against the panes of glass and into the door-jambs and bank, thus presenting to the audience a realistic effect.

While I prefer to employ electricity for operating the fans, they may be operated by hand-power. I may also desire to rotate the perforated cylinders by electric power, but prefer to rotate them by hand, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

In a device of the character described, the combination with the flake-dropper, of means for dropping a pulverized or granular substance, and means for blasting or driving the falling mass across the stage whereby the flakes and pulverized or granular substance are mixed and a realistic snow-storm produced, substantially as and for the purpose set forth.

In testimony whereof I have hereunto set my hand in presence of two subscribing witnesses.

JOSEPH R. GRISMER.

Witnesses:
F. WARREN JOHNSON,
H. B. WILLSON.